April 26, 1949.   R. E. RUSKIN   2,468,114
COUPLING DEVICE

Filed June 8, 1945    2 Sheets-Sheet 1

Inventor
Robert E. Ruskin

By Ralph L Chappell
Attorney

April 26, 1949.                R. E. RUSKIN                2,468,114
                               COUPLING DEVICE
Filed June 8, 1945                                    2 Sheets-Sheet 2
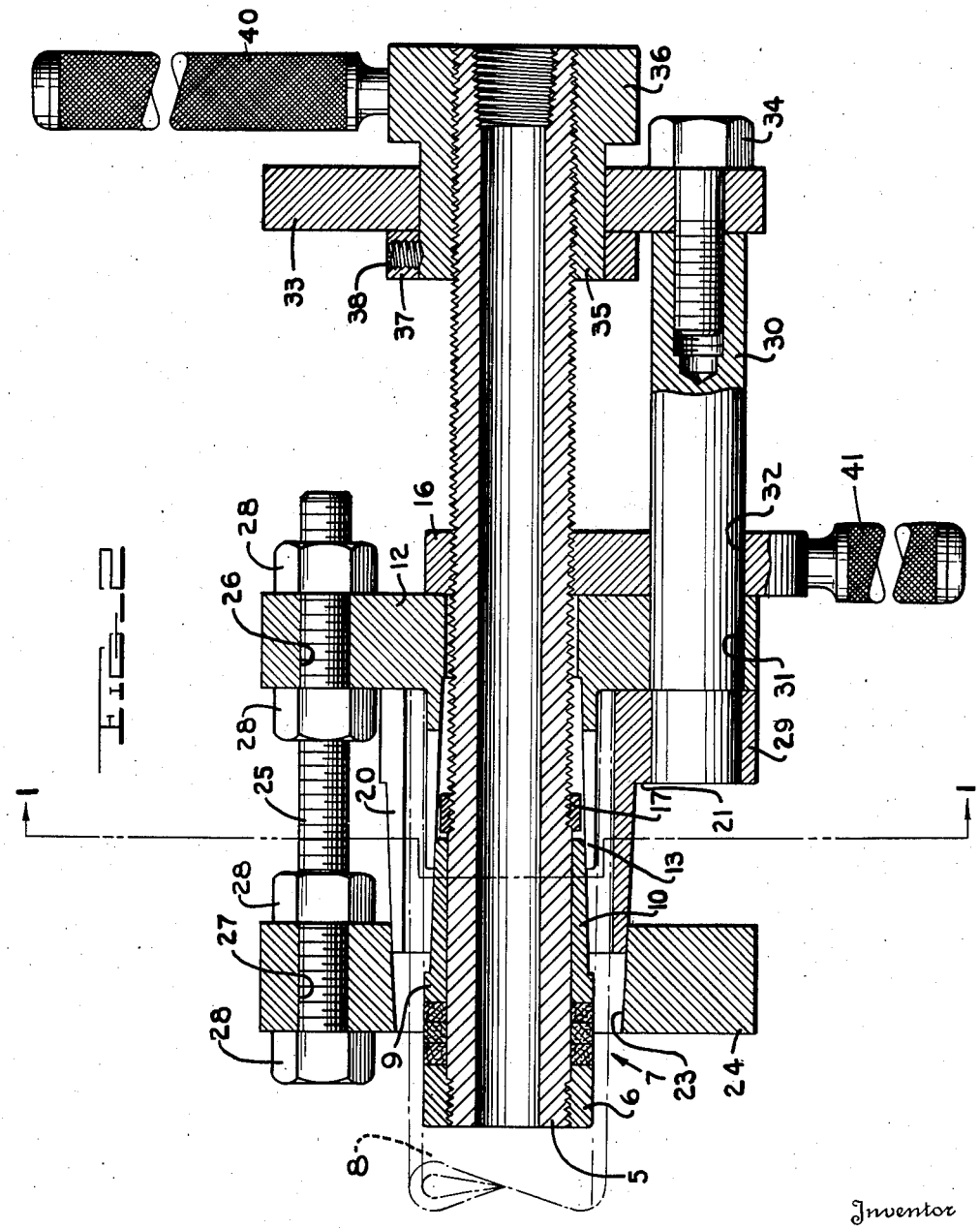
Inventor
Robert E. Ruskin
By Ralph L. Chappell
Attorney Patented Apr. 26, 1949

2,468,114

UNITED STATES PATENT OFFICE 2,468,114

COUPLING DEVICE

Robert E. Ruskin, Washington, D. C.

Application June 8, 1945, Serial No. 598,355

14 Claims. (Cl. 285—22)

(Granted under the act of March 3, 1883, as amended April 30, 1928; 370 O. G. 757)

This invention relates to coupling devices, and more particularly to coupling devices for seamless pipe or tubing.

Where seamless pipe or tubing is employed it may be desirable to provide some means whereby the pressure integrity of the pipe may be tested without threading the end of the pipe or otherwise deforming the end of the pipe to enable a high pressure source to be coupled thereto or to permit temporary sealing of an end of the pipe.

An object of the present invention is to provide an effective and efficient coupling device for seamless pipe or tubing.

In accordance with one embodiment of this invention a coupling device may be provided comprising a shaft having a tapered sleeve slidably mounted thereon and engageable with a radially expandable sleeve to cause the second sleeve to spread and engage the inner wall of a pipe mounted on said shaft. A ring having a tapered, axially extending aperture is concentrically disposed with respect to the shaft and engageable with a contractable sleeve to cause the contractable sleeve to engage the outer wall of the pipe. Means are associated with the shaft to cause the tapered members to respectively expand and contract their associated sleeves, said means being reversible to free the pipe from the sleeves, and means are provided for sealing the coupling device to the pipe.

Other objects and advantages of the present invention will be apparent from the following detailed description taken in conjunction with the drawings wherein:

Fig. 2 is a sectional view taken substantially along the line 2—2 of Fig. 1, showing a pipe in position to be coupled.

Figure 1:
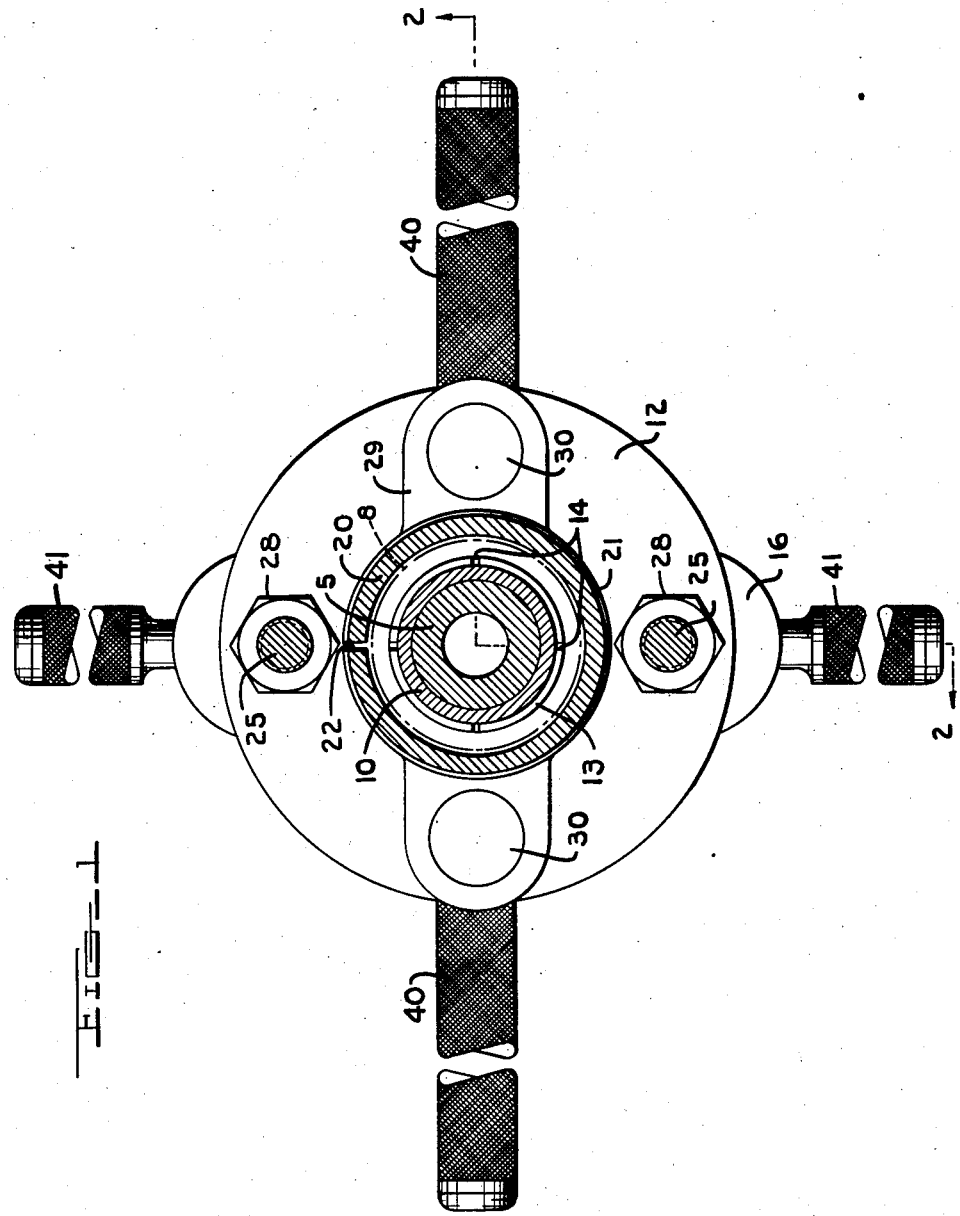
Fig. 1 is a vertical sectional view taken along the line 1—1 of Fig. 2.

Referring now to the drawings, wherein a preferred embodiment of this invention is illustrated, it will be seen that an elongated shaft 5 is provided, which, where the coupling device is to be employed to connect the pipe to a pressure source may be hollow, as shown, but otherwise may be solid, and, as shown in Fig. 2, is externally threaded for a short portion extending to the right from the left end of the shaft and for a very much longer portion extending to the left from the right end of the shaft 5. A collar 6 is threaded to the left end of the shaft, as shown in Fig. 2, to retain on the shaft a gasket or packing assembly 7, which may comprise a plurality of rings made of a relatively soft and compressible material, such as leather, so that they may be compressed together and caused to expand sufficiently to engage the interior wall of a pipe to be coupled, which may be located on the shaft 5 as indicated by the dotted lines 8, and thereby to form a seal. Immediately adjacent the right side of the gasket assembly is positioned a shouldered portion 9 of a tapered sleeve 10, which is mounted on the shaft 5 and slidable therealong to cause the left face of the shoulder 9 to bear against the right side of the gasket assembly, the smaller portion of the tapered sleeve extending toward the right end of the shaft 5.

When an end of a pipe or tube is positioned on the shaft 5 and properly located to be engaged by the coupling device, the right end of the pipe bears against the left face of a large ring 12, which is mounted on the shaft 5 substantially in the middle thereof and is freely rotatable thereon. A sleeve 13, having an outer diameter slightly less than the inner diameter of the pipe 8, is integrally formed with the left face of the ring 12 and extends to the left along the shaft 5 a suitable distance to receive the right end of the tapered sleeve 10. The sleeve 13 is provided with a number of longitudinally extending slots 14 formed in its left portion and when the shaft 5 is moved to the right, causing the shoulder 9 to bear against the gasket assembly 7, the tapered portion of the sleeve 10 is caused to enter the sleeve 13 and to spread the portions of the sleeve 13 intermediate the slots 14 outward, that is, to expand the sleeve and cause it to engage the right end portion of the inner wall of a pipe positioned on the shaft as shown, the ring 12 being prevented from moving to the right by a plate 16 which is mounted on and fixed to the shaft 5 adjacent the right side of the ring 12. In order to cause the sleeve 10 to move to the left out of the sleeve 13 when the shaft 5 is moved to the left to permit removal of a pipe from the coupling device, a small ring 17 is mounted on and fixed to the shaft 5, being slightly spaced from the right end of the sleeve 10 when the shoulder 9 bears against the right end of the gasket assembly. By spacing the ring 17 slightly further from the gasket 7 than the length of the sleeve 10, it will be apparent that the sleeve 10 is permitted to move slightly away from the gasket assembly and thus to relieve the pressure thereon when the coupling is to be removed from the pipe.

The outer right end portion of the pipe or tube being coupled is engageable by a sleeve 20, which has an internal diameter slightly greater than the external diameter of the pipe to be coupled and is concentrically disposed with respect to the sleeve 13. The sleeve 20 is carried by an integrally formed heavy flange 21, which extends at right angles from the right end of the sleeve 20, and the sleeve 20 is supported, as will be hereinafter described, so as to be longitudinally movable with respect to the shaft 5. The left outer portion of the sleeve 20 is provided with a taper of substantially the same degree as the taper formed along the interior of the sleeve 13 and the exterior of the sleeve 10, and a longitudinally extending slot 22 is formed in the left portion of the sleeve 20 so that the sleeve 20 may be compressed radially inwardly and caused to clamp flatly against the outer wall of the pipe being coupled.

In order to clamp the sleeve 20 against the pipe, the left end of the sleeve extends into a suitably tapered aperture 23 formed in a heavy ring 24, concentrically disposed with respect to the shaft 5 and adjacent the left end thereof. The ring 24 is rigidly supported in spaced relation to the ring 12 by a pair of threaded shafts 25 which extends through apertures 26 formed in the periphery of the ring 12 and corresponding apertures 27 formed in the periphery of the ring 24. The shafts are rigidly fixed to the rings by associated nuts 28 which are positioned on either side of the rings, as illustrated in Figure 2.

In the operation of this coupling device, the sleeve 20 is caused to move to the left relatively to the shaft 5 at the same time as the sleeve 10 is moved to the right, thus applying clamping pressure substantially equally to the outer wall and to the inner wall of the pipe being coupled. In order to move the sleeves in this manner, a pair of shafts 30 are fixed to lugs 29 integrally formed on opposite sides of the flange 21, as shown in Fig. 1 and the shafts extend to the right substantially parallel to the shaft 5 through apertures 31 and 32 formed in the outer portion of the heavy ring 12 and the outer end of the plate 16 respectively. The right ends of the shaft are axially apertured and internally threaded as shown to enable the shafts to be fixed to a heavy ring 33 by bolts 34 which extend through the outer portion of the ring 33 and engage the threaded ends of the shafts. The ring 33 is mounted about the periphery of a heavy, cylindrical block 35, which is axially apertured and internally threaded to engage the threaded right portion of the shaft 5, on which it is mounted, the block 35 being rotatable relatively to the ring 33 and the shaft 5. In order to retain the ring 33 on the block 35, the block 35 is provided at its right end with a shoulder 36, while its left end has a ring 37 mounted thereon and fixed thereto by a set screw 38. The spacing between the right face of the ring 37 and the left face of the shoulder 36 is made somewhat greater than the thickness of the ring 33 in order to permit the coupling device to be self tightening on the pipe 8, as will be hereinafter explained. Handles 40 are fixed to and extend from either side of the shoulder 36 to facilitate rotating the block 35 while a second set of handles 41 are fixed to the outer ends of the plate 16 to facilitate handling the coupling device.

From the foregoing description, it will be apparent that by rotating the block 35 to cause it to move to the left from the starting position shown in Fig. 2, the ring 33 will be engaged by the left face of the shoulder 36 and caused to move to the left with the block 35, thus carrying the flange 21 and associated sleeve 20 to the left relatively to the shaft 5. As the sleeve 20 enters the tapered aperture formed in the ring 24 and the tapered portion of the sleeve is caused to contract and engage the other surface of the pipe 8, it will be apparent that the resistance to further movement will gradually increase. A point is reached at which it is easier for the shaft 5 to move to the right relatively to the sleeve 20 than it is for the sleeve 20 to move into the tapered aperture 23, thus causing the tapered sleeve 10 to enter the sleeve 13 and spread it outwardly against the inner wall of the pipe being coupled. It will be understood, of course, that this sequence of operation is merely illustrative of one possibility, and that it is perfectly possible for the shaft 5 to initially carry the tapered sleeve 10 into the sleeve 13 prior to any relative movement occurring between the sleeve 20 and the ring 24. The important point is that by reason of the design of this apparatus, a balance is struck so that substantially equal clamping pressure is applied to both the outer wall and the inner wall of the pipe and that while it is possible for the clamping sleeves to move alternately, it is equally possible for the sleeves to move simultaneously.

The cylindrical block 35 is rotated and moved to the left relatively to the shaft 5 until the desired clamping pressure is obtained. After the pipe has been securely clamped by the coupling device, if connection is to be made to a pressure source, in which case the shaft 5 is made hollow, a pipe, not shown, having a suitably threaded end may be connected to the right end of the shaft 5, which may be internally threaded, as shown, to receive and engage such a pipe and hydrostatic pressure applied therefrom through the coupling to the pipe to be tested. On the other hand, the coupling device may be employed to seal the end of the pipe and the shaft 5 be made solid or if hollow, provided with a suitable plug, not shown. In practice it has been found that this coupling device will not fail at pressures greatly in excess of four thousand pounds per sq. inch, and that if, as the pressure is applied, the inner sleeve tends to slip, the slippage is transferred to the outer sleeve causing the outer sleeve to be contracted and thereby to increase the clamping pressure. The reason for this is clearly evident from an examination of Fig. 2. If the pipe 8 tends to move to the left relatively to the sleeve 13, after having been clamped in the coupling device, it will tend to cause the sleeve 20 to move further into the tapered recess 23 formed in the ring 24, causing the sleeve 20 to be contracted and thereby to increase the clamping pressure applied by the sleeve. Since this correspondingly forces the pipe 8 inwardly, the effective clamping pressure applied by the inner sleeve 13 is increased and thus any tendency of the pipe 8 to move to the left relatively to the sleeve 13 tends to cause both the clamping sleeves 13 and 20 to increase their clamping force and to cooperatively prevent any such slippage. On the other hand, if the pipe tends to slip relatively to the sleeve 20, it will cause the sleeve 13 to move to the left relatively to the tapered sleeve 10, thus expanding the sleeve 13 and increasing its clamping pressure against the inner wall of the pipe and at the same time causing the outer sleeve 20 to be more closely engaged by the outer wall of the pipe 8. It will be understood that the pipe 8 will normally not slip with respect to both the inner and outer sleeves simultaneously if sufficient pressure is initially applied. Consequently, the result is a self-tightening coupling. It will be understood that sufficient space must be allowed between the shoulder 36 and the ring 38 to permit sufficient freedom of movement of the ring 33 and associated parts in order to obtain this self-tightening feature.

When it is desired to remove the coupling device from the end of the pipe, it is merely necessary to reverse the direction of rotation of the cylindrical block 35. This causes the ring 38 mounted thereon to engage the left face of the ring 33 and to move the associated connecting shafts 30 to the right relatively to the shaft 5. This in turn moves the sleeve 20 to the right out of the aperture 23 and causes the flange 21 associated with the sleeve 20 to engage the left face of the ring 12 and to move the sleeve 12 to the right relatively to the shaft 5, causing the inner clamping sleeve 13 to move away from the tapered sleeve 10. At first, the sleeve 10 will tend to follow the sleeve 13, but after a slight movement, sufficient to relieve the pressure on the gasket assembly 7, the sleeve 10 is prevented from moving further to the right relatively to shaft 5 by the ring 17. Continued rotation of the block 35 then completely frees the pipe 8 from the coupling device.

Where herein the various parts of the invention have been referred to as being located in a right or left position, it will be understood that this is done solely for the purpose of facilitating description and the references relate only to the relative positions of the parts as shown in the accompanying drawings.

While but one embodiment of this invention has been shown and described, it will be understood that many changes and modifications may be made herein without departing from the spirit or the scope of the present invention, which is limited only by the appended claims.

The invention shown and described herein may be manufactured or used by or for the Government of the United States of America for governmental purposes without the payment of any royalties thereon or therefor.

What is claimed is:

1. A coupling device comprising a shaft, a first tapered sleeve carried by said shaft, a second tapered sleeve carried by said shaft and longitudinally movable therealong, said first sleeve being receivable in said second sleeve to cause said second sleeve to be expanded outwardly, a third sleeve concentrically disposed with respect to said first and second sleeves, means reducing the diameter of said third sleeve, and means moving said first sleeve into said second sleeve.

2. In a coupling device a shaft, a tapered member mounted on said shaft, an expansible member disposed about said shaft and expansible by said tapered member, means for causing said tapered member to expand said expansible member, a contractable member concentrically disposed with respect to said shaft, and means for contracting said contractable member.

3. In a coupling device, a threaded shaft, a collar threaded on one end of said shaft, a gasket assembly positioned adjacent said collar, a first sleeve having an external longitudinally extending taper, said first sleeve disposed about said shaft with the larger end thereof engageable with one side of said gasket assembly, a second sleeve disposed about said shaft and having an internal longitudinally extending taper, said first sleeve being receivable in said second sleeve to expand said second sleeve outwardly, a ring disposed about said shaft for supporting said second sleeve, a third sleeve having an external taper concentrically disposed with respect to said second sleeve, a second ring disposed about said shaft and maintained in fixed spaced relation to said first ring, said second ring having an aperture of suitable dimension to receive the smaller portion of said third sleeve and to cause said third sleeve to be contracted upon moving into said aperture, and means for forcing said third sleeve to enter said aperture to contract said third sleeve and for moving said first sleeve into said second sleeve.

4. In a device for engaging in clamping relation both the inner and outer walls of an end of a tubular member, a shaft receivable in an end of said member, a tapered sleeve mounted on said shaft, an expandable sleeve mounted on said shaft adjacent said tapered sleeve, said tapered sleeve being movable into said expandable sleeve to cause it to expand radially and engage the inner wall of said tubular member, an outer tapered sleeve concentrically disposed about said expandable member and contractable to engage the outer wall of said tubular member, means for contracting said outer sleeve, and means for moving said tapered sleeve into said expandable sleeve.

5. In a device for engaging in clamping relation both the inner and outer walls of an end of a tubular member, a shaft, a tapered sleeve mounted on said shaft, an expandable sleeve mounted on said shaft adjacent said tapered sleeve, said tapered sleeve being receivable in said expandable sleeve to radially expand said expandable sleeve, said shaft and said sleeves being receivable in an end of said tubular member, an outer contractable sleeve disposed about said shaft to engage the outer wall of the tubular member, means contracting said outer sleeve, and means moving said tapered sleeve into said expandable sleeve.

6. In a device for engaging in clamping relation both the inner and outer walls of an end of a tubular member, an externally threaded shaft, packing means mounted about an end of said shaft, means for retaining said packing means on said shaft, a tapered sleeve mounted on said shaft and movable thereon to engage and compress said packing means, an expandable sleeve disposed about said shaft, said tapered sleeve being receivable in said expandable sleeve to radially expand said expandable sleeve, an outer contractable tapered sleeve concentrically disposed with respect to said expandable sleeve, means engaging the periphery of said outer sleeve to contract said outer sleeve and means moving said tapered sleeve to expand said expandable sleeve.

7. In a device for engaging in clamping relation the inner and outer walls of a tubular member, a first sleeve disposed within said member, a second sleeve disposed outside said member, means increasing the external diameter of said first sleeve and means reducing the internal diameter of said second sleeve.

8. A coupling device comprising a first sleeve having a normally constant external diameter and a gradually varying internal diameter, a second sleeve having a normally constant internal diameter and a gradually varying external diameter, means concentrically positioning said second sleeve about said first sleeve, and means cooperating with said varying diameters to respectively increase and decrease said normally constant external and internal diameters.

9. A coupling device comprising a shaft, a first tapered sleeve carried by said shaft, a second tapered sleeve carried by said shaft, said first sleeve being receivable in said second sleeve to expand said second sleeve outwardly, a third tapered sleeve concentrically disposed with respect to said first and said second sleeve, means reducing the diameter of said third sleeve and means moving said first sleeve into said second sleeve.

10. In a device for engaging in clamping relation the inner and outer walls of a tubular member, means engaging the outer wall of said member in clamping relation, means engaging the inner wall of said member in clamping relation, means responsive to relative movement between said outer wall and said outer wall engaging means for increasing the clamping pressure between said inner wall engaging means and said inner wall and means responsive to relative movement between said inner wall engaging means and said inner wall to increase the clamping pressure between said outer wall engaging means and said outer wall.

11. In a device for engaging in clamping relation the opposite surfaces of a member to be clamped, means engaging one surface of said member in clamping relation, means engaging the other surface of said member in clamping relation, means responsive to relative movement between said one surface engaging means and said one surface to increase the clamping pressure between said other surface engaging means and said other surface and means responsive to relative movement between said other surface engaging means and said other surface to increase the clamping pressure between said one surface engaging means and said one surface.

12. In a device for engaging in clamping relation the opposite surfaces of a member to be clamped, a first clamping member including a face parallel to one surface of said member and a face inclined in one direction to said one surface, a second clamping member including a face parallel to the other surface of said member and a face inclined to said other surface in a direction opposite said one direction and means cooperating with said inclined faces and responsive to movement of said first and said second clamping means to clamp said member between said parallel faces.

13. In a device for engaging in clamping relation opposite surfaces of a member to be clamped, a first clamping member including a face parallel to and engaging one surface of said member in clamping relation and a face inclined in one direction to said one surface, a second clamping member including a face parallel to and engaging the other surface of said member in clamping relation and a face inclined to said other surface in a direction opposite said one direction, and means responsive to relative movement between said surfaces and cooperating parallel faces to increase the clamping pressure between the other surface and cooperating parallel face.

14. A device for engaging in clamping relation the inner and outer walls of a tubular member comprising a first sleeve disposed within said member, a second sleeve disposed outside said member, means increasing the external diameter of said first sleeve and reducing the internal diameter of said second sleeve and means operating the last-named means for moving said sleeves into contact with said walls under substantially equal pressures.

ROBERT E. RUSKIN.

REFERENCES CITED

The following references are of record in the file of this patent:

UNITED STATES PATENTS

| Number | Name | Date |
| --- | --- | --- |
| 24,179 | McLeod | May 24, 1859 |
| 1,646,660 | Prince | Oct. 25, 1927 |